(No Model.)

C. T. REMUS.
CORNER FASTENER FOR PAPER BOXES.

No. 343,340. Patented June 8, 1886.

United States Patent Office.

CARL THEODOR REMUS, OF DRESDEN, SAXONY, GERMANY, ASSIGNOR TO JEAN SCHERBEL, OF SAME PLACE.

CORNER-FASTENER FOR PAPER BOXES.

SPECIFICATION forming part of Letters Patent No. 343,340, dated June 8, 1886.

Application filed February 17, 1886. Serial No. 192,211. (No model.) Patented in Austria-Hungary October 10, 1885, No. 26,216, and in Belgium January 19, 1886, No. 71,689.

*To all whom it may concern:*

Be it known that I, CARL THEODOR REMUS, a subject of the Emperor of Prussia, residing at the city of Dresden, in the Kingdom of Saxony, Empire of Germany, have invented certain new and useful Improvements in Corner-Fasteners for Paper Boxes, of which the following is a specification.

The object of my invention is to provide a new and improved fastening device to be applied on the edges and corners of boxes made of paper, pasteboard, or veneer, for the purpose of holding the sides, top, and bottom of the said boxes together, also protecting the edges and forming hinges, which fastening device can be attached very easily and rapidly and is held in place securely.

The invention consists in a strip of sheet metal having teeth formed on the edges, the ends of which teeth can be bent over to form prongs to be driven into the sides of the boxes, all as will be fully described hereinafter, and finally pointed out in the claims.

In the accompanying drawings, Figure 1 is a face view of my improved corner-fastener for boxes. Fig. 2 is a cross-sectional view of the same. Fig. 3 is a face view of the same, with the ends of the teeth bent over. Fig. 4 is a cross-sectional view of the same. Fig. 5 is a cross-sectional view of the box on the upper edges of which the fastener is applied. Fig. 6 is a longitudinal sectional view of a box cover on the corners of which the fasteners shown in Fig. 13 are applied. Fig. 7 is a longitudinal sectional elevation of a box-cover the side edges of which are formed by the fastener. Figs. 8, 9, and 10 are cross-sections of the fastener bent in different shapes. Fig. 11 is a face view of the fastener provided with slots adapting it to be used as a hinge. Fig. 12 shows two fasteners united to form a hinge. Fig. 13 shows the fastener in two parts, to be used separately. Fig. 14 is a cross-sectional view of a part of the box, showing the manner of using the fastener shown in Fig. 13. Fig. 15 shows two detached fasteners bent to be used as hinges. Fig. 16 is a cross-sectional view of part of the box having a hinge formed of the two fasteners shown in Fig. 15. Figs. 17, 18, 19, 20, and 21 show different shapes of the fastener. Figs. 22 and 23 are cross-sections of the fastener shown in Figs. 17, 18, 19, and 20. Fig. 24 is a cross sectional view of the fastener shown in Fig. 21, and Fig. 25 is a sectional view of a corner of a box to which my improved fastener is applied.

Similar letters of reference indicate corresponding parts.

The fastener consists of the sheet-metal strip A, which is punched out in such a manner as to have teeth B in the shape of isosceles triangles on the longitudinal edges. The ends of the teeth B are bent over to incline toward each other, as shown in Fig. 4, thereby forming the prongs C at acute angles to the face of the strip. To protect the edges of the box, the fasteners or strips A are placed on the edges of the same, bent down on both faces of the sides and ends of the box, and the prongs C forced into the faces of the sides and ends of the box, whereby the strips are held securely on the said edges.

If desired, the strip can be cut lengthwise into two parts, as shown in Fig. 13, each of which can be used on the edges of the box, said strips having teeth on one side edge only. To fasten the corners of the box cover or bottom, the strips are placed against the side of the box, the teeth bent over the sides or bottom of the box, and the prongs C forced into the said top or bottom, as shown in Fig. 6.

In case the sides and ends of the cover are to be formed by means of a strip, A, having teeth on one edge only, the strip is placed against the side and end edges of said cover, the teeth are bent over the top of the cover, and the prongs C forced into the cover, as shown in Fig. 7.

The strip shown in Fig. 13 may also be used for a protector for the edge of a box, as shown in Fig. 14, the smooth edge of the strip being flush with the top edge of the box and the prongs on the lower edges of said strip being forced into the sides of the box.

If desired, the length of the teeth can be such that the apices of the V-shaped recesses between the teeth are all on the central longitudinal line of the strip, as shown in Figs. 17 and 18, or, if desired, said apices may be alternately on opposite sides of the longitudinal central line of the strip, as shown in Figs. 19 and 20, and said strips may be straight or curved, as shown in Figs. 18 and 20. The ends of the teeth are also bent down to form prongs C. Said strips are then bent on the longitudinal line to form an obtuse angle, as shown in Figs. 23 and 24, which angle is to be of suitable size, according to the angle of the corner of the box to which the fastener is to be applied—as, for example, shown in Fig. 25.

If desired, the strip A, provided with teeth in the opposite edges, may be cut on a meandering line, as shown in Fig. 21, so as to form two strips having short teeth B at one edge and long teeth K on the other, the ends of both said teeth being bent over to form the prongs L and C, as shown in Fig. 24.

In case the fasteners are to be used for forming hinges, they are provided with slots E, the widths of which in the direction of the length of the strip are equal to the parts of metal G between the slots, as shown in Fig. 11. The strips are then bent over to have approximately a V-shaped cross-section, as shown in Fig. 9, and each of said strips, bent in the manner stated, are fastened by means of their prongs C, one on the edge of the side $a$ of the box and the other on the edge of the cover $b$, so that a space will be left between the apices of said V-shaped strips and the edges of the side $a$ or cover $b$. The strips are then interlocked in such a manner that the metal parts between the edges of two slots of one strip pass into the slots of the other, and then a pin, F, is passed through the spaces between the apices of the said V-shaped strips and the edges of the parts of the box, thereby forming a hinge.

Fig. 15 shows the side and cover of a box before they are united with the hinge open, and Fig. 16 shows them united. The strips shaped as shown in Figs. 21 and 24 can also be used in a similar way to form hinges.

Both sides and ends of the cover can be provided with approximately V-shaped strips, as shown in Figs. 9, 10, and 24, and the pins F passed through the strips for the purpose of uniting the bottom, cover, sides, and ends of the box, whereby knockdown boxes are formed which can be taken apart or erected very easily and rapidly, and occupy very little space when folded.

Having thus described my invention, I claim as new and desire to secure by Letters Patent—

1. A fastener for edges and corners of boxes, consisting of a sheet-metal strip having teeth on one or both edges, the ends of said teeth being bent at an angle to the face of the strip to form fastening-prongs, substantially as herein shown and described.

2. A fastener for the edges and corners of boxes, consisting of a sheet-metal strip having teeth formed on both side edges, which teeth have their ends bent down to form fastening-prongs, the strip being bent on its longitudinal axis to have an approximately V-shaped cross-section, substantially as herein shown and described.

3. A fastener for the edges and corners of boxes, consisting of a sheet-metal strip having teeth formed on the side edges, the ends of which teeth are bent at an angle to the strip to form fastening-prongs, said strip being provided with slots, substantially as herein shown and described.

In testimony whereof I have signed my name to this specification in the presence of two subscribing witnesses.

CARL THEODOR REMUS.

Witnesses:
PAUL DRUCKMÜLLER,
EMIL DOMSCH.